US012665932B2

(12) United States Patent
Lee et al.

(10) Patent No.: US 12,665,932 B2
(45) Date of Patent: Jun. 23, 2026

(54) MIDDLEBOX SECURITY IN A WIRELESS NETWORK

(71) Applicant: QUALCOMM Incorporated, San Diego, CA (US)

(72) Inventors: Soo Bum Lee, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 18/608,509

(22) Filed: Mar. 18, 2024

(65) Prior Publication Data

US 2025/0294059 A1 Sep. 18, 2025

(51) Int. Cl.
*H04L 29/06* (2006.01)
*H04L 9/40* (2022.01)
*H04W 12/08* (2021.01)

(52) U.S. Cl.
CPC ............. *H04L 63/20* (2013.01); *H04W 12/08* (2013.01)

(58) Field of Classification Search
CPC ....... H04L 63/20; H04L 63/10; H04L 63/123; H04L 63/0884; H04L 63/0263; H04W 12/08
See application file for complete search history.

(56) References Cited

FOREIGN PATENT DOCUMENTS

| EP | 4135256 A1 | 2/2023 |
| WO | 2019139852 A1 | 7/2019 |
| WO | 2021041062 A1 | 3/2021 |
| WO | WO 2021041062 | * 4/2021 |

OTHER PUBLICATIONS

International Search Report and Written Opinion—PCT/US2025/018727—ISA/EPO—Jul. 4, 2025.
Partial International Search Report—PCT/US2025/018727—ISA/EPO—May 13, 2025.

* cited by examiner

*Primary Examiner* — Longbit Chai
(74) *Attorney, Agent, or Firm* — Harrity & Harrity, LLP

(57) ABSTRACT

Various aspects of the present disclosure generally relate to wireless communication. In some aspects, a network entity may receive, from a security service device, a middlebox security policy, wherein the middlebox security policy is associated with a user equipment (UE) and a service device, and wherein the middlebox security policy indicates a set of authorization policies relating to one or more of the UE or the service device. The network entity may receive a communication on a communication link between the UE and the service device. The network entity may transmit the communication in accordance with the middlebox security policy. Numerous other aspects are described.

20 Claims, 10 Drawing Sheets

500

Service Device
515

505

Middlebox
510

530

525

Provide communication
530 in accordance with
security protocol

530

Device
520

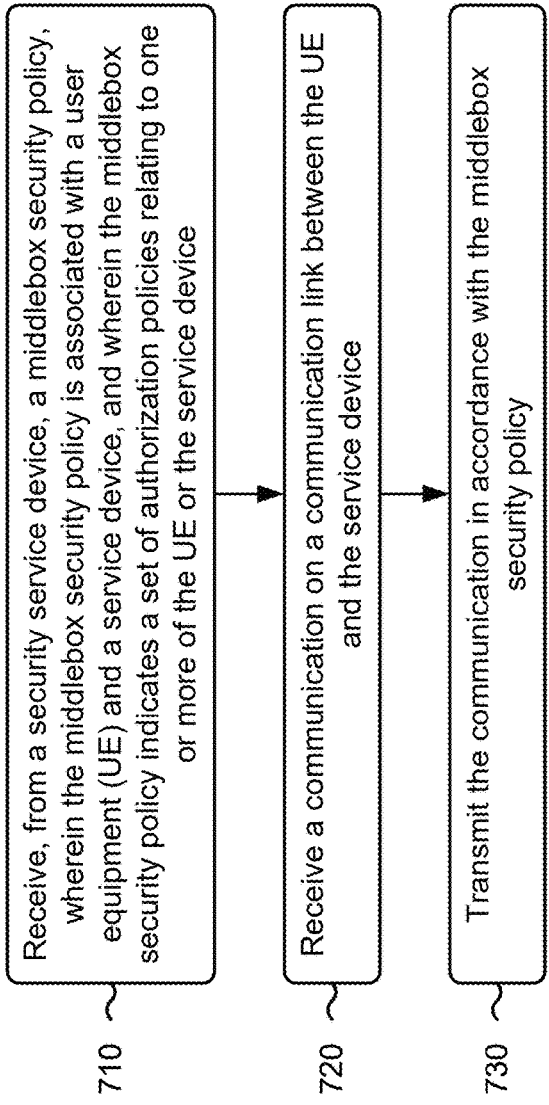

710 — Receive, from a security service device, a middlebox security policy, wherein the middlebox security policy is associated with a user equipment (UE) and a service device, and wherein the middlebox security policy indicates a set of authorization policies relating to one or more of the UE or the service device 720 — Receive a communication on a communication link between the UE and the service device 730 — Transmit the communication in accordance with the middlebox security policy

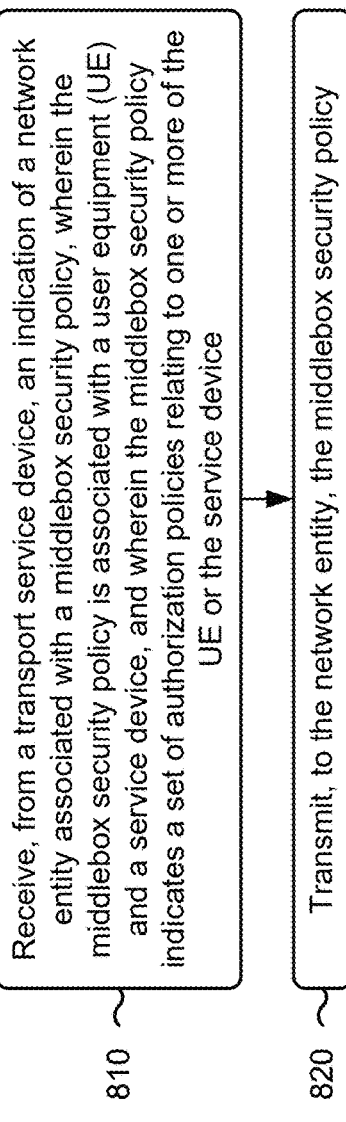

810 — Receive, from a transport service device, an indication of a network entity associated with a middlebox security policy, wherein the middlebox security policy is associated with a user equipment (UE) and a service device, and wherein the middlebox security policy indicates a set of authorization policies relating to one or more of the UE or the service device

820 — Transmit, to the network entity, the middlebox security policy

FIG. 8

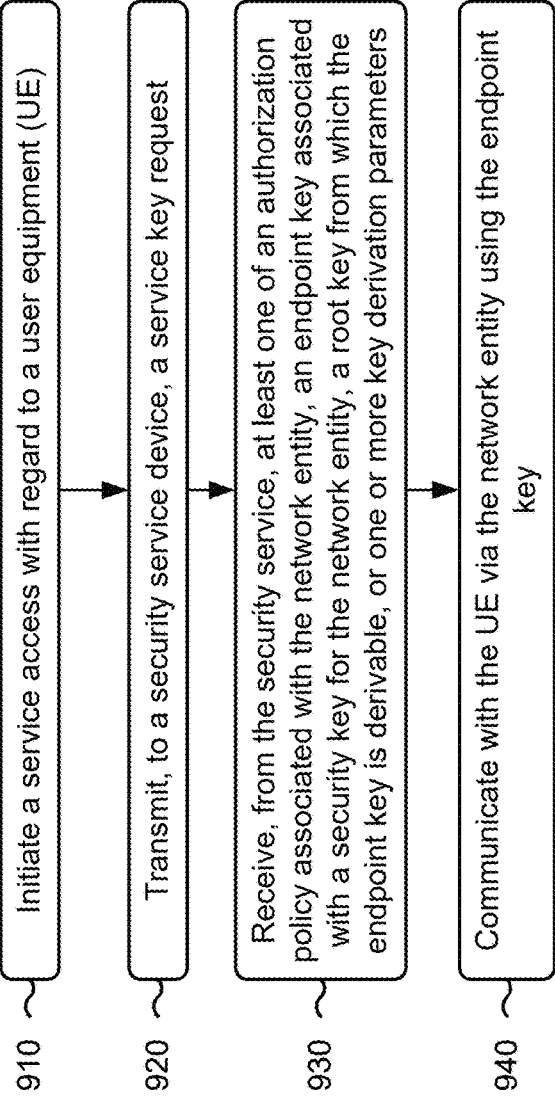

910 Initiate a service access with regard to a user equipment (UE)

920 Transmit, to a security service device, a service key request

930 Receive, from the security service, at least one of an authorization policy associated with the network entity, an endpoint key associated with a security key for the network entity, a root key from which the endpoint key is derivable, or one or more key derivation parameters 940 Communicate with the UE via the network entity using the endpoint key

MIDDLEBOX SECURITY IN A WIRELESS NETWORK

FIELD OF THE DISCLOSURE

Aspects of the present disclosure generally relate to wireless communication and specifically relate to techniques, apparatuses, and methods for middlebox security in a wireless network.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a method of wireless communication performed by a network entity includes receiving, from a security service, a middlebox security policy, wherein the middlebox security policy is associated with a user equipment (UE) and a service, and wherein the middlebox security policy indicates a set of authorization policies relating to one or more of the UE or the service; receiving a communication on a communication link between the UE and the service; and transmitting the communication in accordance with the middlebox security policy.

In some aspects, a method of wireless communication performed by a security service includes receiving, from a transport service, an indication of a network entity associated with a middlebox security policy, wherein the middlebox security policy is associated with a UE and a service, and wherein the middlebox security policy indicates a set of authorization policies relating to one or more of the UE or the service; and providing, to the network entity, the middlebox security policy.

In some aspects, a method of wireless communication performed by a service includes initiating a service access with regard to a UE; transmitting, to a security service, a service key request; receiving, from the security service, at least one of: an endpoint key associated with a security key for a network entity, or a root key from which the endpoint key is derivable; and communicating with the UE via the network entity using the endpoint key.

In some aspects, an apparatus for wireless communication at a network entity includes one or more memories; and one or more processors, coupled to the one or more memories, configured to cause the network entity to: receive, from a security service, a middlebox security policy, wherein the middlebox security policy is associated with a UE and a service, and wherein the middlebox security policy indicates a set of authorization policies relating to one or more of the UE or the service; receive a communication on a communication link between the UE and the service; and transmit the communication in accordance with the middlebox security policy.

In some aspects, an apparatus for wireless communication at a security service includes one or more memories; and one or more processors, coupled to the one or more memories, configured to cause the security service to: receive, from a transport service, an indication of a network entity associated with a middlebox security policy, wherein the middlebox security policy is associated with a UE and a service, and wherein the middlebox security policy indicates a set of authorization policies relating to one or more of the UE or the service; and provide, to the network entity, the middlebox security policy.

In some aspects, an apparatus for wireless communication at a service includes one or more memories; and one or more processors, coupled to the one or more memories, configured to cause the service to: initiate a service access with regard to a UE; transmit, to a security service, a service key request; receive, from the security service, at least one of: an endpoint key associated with a security key for a network entity, or a root key from which the endpoint key is derivable; and communicate with the UE via the network entity using the endpoint key.

In some aspects, a non-transitory computer-readable medium storing a set of instructions for wireless communication includes one or more instructions that, when executed by one or more processors of a network entity, cause the network entity to: receive, from a security service, a middlebox security policy, wherein the middlebox security policy is associated with a UE and a service, and wherein the middlebox security policy indicates a set of authorization policies relating to one or more of the UE or the service; receive a communication on a communication link between the UE and the service; and transmit the communication in accordance with the middlebox security policy.

In some aspects, a non-transitory computer-readable medium storing a set of instructions for wireless communication includes one or more instructions that, when executed by one or more processors of a security service, cause the security service to: receive, from a transport service, an indication of a network entity associated with a middlebox security policy, wherein the middlebox security policy is associated with a UE and a service, and wherein the middlebox security policy indicates a set of authorization policies relating to one or more of the UE or the service; and provide, to the network entity, the middlebox security policy.

In some aspects, a non-transitory computer-readable medium storing a set of instructions for wireless communication includes one or more instructions that, when executed by one or more processors of a service, cause the service to: initiate a service access with regard to a UE; transmit, to a security service, a service key request; receive, from the security service, at least one of: an endpoint key associated with a security key for a network entity, or a root key from which the endpoint key is derivable; and communicate with the UE via the network entity using the endpoint key.

In some aspects, an apparatus for wireless communication includes means for receiving, from a security service, a middlebox security policy, wherein the middlebox security policy is associated with a UE and a service, and wherein the middlebox security policy indicates a set of authorization policies relating to one or more of the UE or the service; means for receiving a communication on a communication link between the UE and the service; and means for transmitting the communication in accordance with the middlebox security policy.

In some aspects, an apparatus for wireless communication includes means for receiving, from a transport service, an indication of a network entity associated with a middlebox security policy, wherein the middlebox security policy is associated with a UE and a service, and wherein the middlebox security policy indicates a set of authorization policies relating to one or more of the UE or the service; and means for providing, to the network entity, the middlebox security policy.

In some aspects, an apparatus for wireless communication includes means for initiating a service access with regard to a UE; means for transmitting, to a security service, a service key request; means for receiving, from the security service, at least one of: an endpoint key associated with a security key for a network entity, or a root key from which the endpoint key is derivable; and means for communicating with the UE via the network entity using the endpoint key.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 7 is a diagram illustrating an example process performed, for example, at a network entity or an apparatus of a network entity, in accordance with the present disclosure.

FIG. 8 is a diagram illustrating an example process performed, for example, at a security service or an apparatus of a security service, in accordance with the present disclosure.

FIG. 9 is a diagram illustrating an example process performed, for example, at a service or an apparatus of a service, in accordance with the present disclosure.

DETAILED DESCRIPTION

Figure 1:
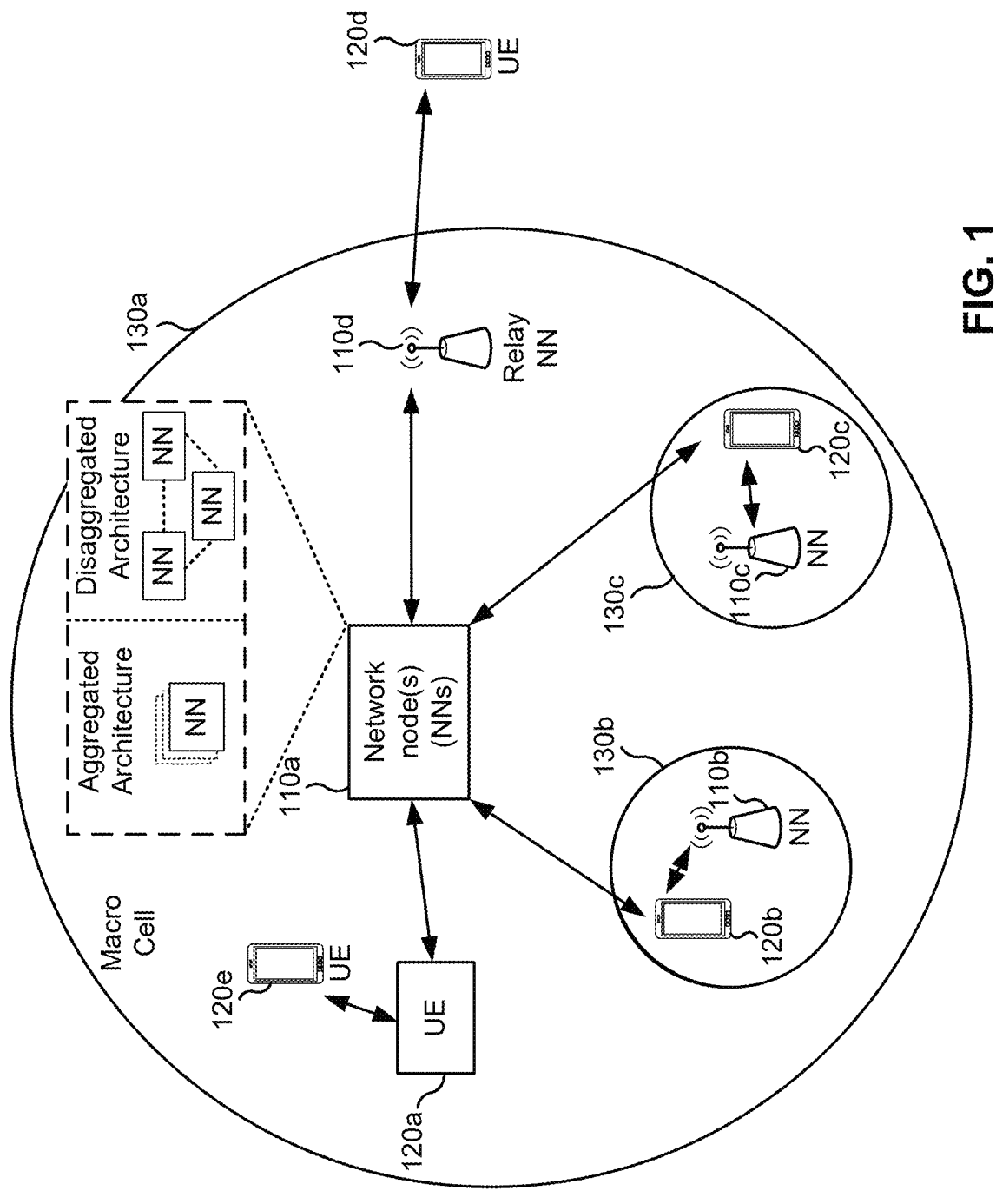
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A network may provide a communication link between endpoint devices. An endpoint device may include any device or network function that communicates via the network. As an example, endpoint devices in a wireless network may include user equipments (UEs), network nodes, or network functions. In some examples, one or more network functions may be implemented at a network device (e.g., a network node), such as a server device in communication with the network. It should be noted that an endpoint device may not necessarily be the final recipient of a communication via the wireless network. For example, a gNB may be an endpoint device for a UE's communication via a wireless network, even if the communication is destined to another device. In some examples, endpoint devices of a wireless network may provide security for communications with one another. For example, a network node and a UE may establish a secure connection that implements physical-layer security and/or medium access layer (e.g., MAC) security for communications via the secure connection.

There are situations in which endpoint security may not be feasible or sufficient to provide desired results in a network. For example, many Internet of Things (IoT) devices are not kept up to date with patches to implement security updates. As another example, battery-constrained devices may not be capable of providing their own security. As yet another example, many devices are past a "sunset" or end-of-life point and are thus not subject to updates. There are also certain functions that may not be feasible to implement by endpoint devices alone (without intervention by a network function situated between the endpoint devices), such as proxies and intrusion detection.

A wireless network may implement a service-based architecture. In a service-based architecture, functions traditionally handled by hardware devices or core network entities may be handled by network functions, such as cloud-implemented network functions or network functions implemented on network devices. A service-based architecture may represent a convergence of radio access network (RAN) functions and core network functions. For example, in a traditional 5G network, some mobility functions may be handled by the gNB (e.g., distributed unit) and other mobility functions may be handled by a core network (CN) entity such as an access and mobility management function (AMF). In a service-based architecture, the mobility functions of the CN and the mobility functions of the gNB may implemented by a mobility service. UEs and network nodes (e.g., gNBs) may interface with such services via interfaces such as application programming interfaces. Thus, efficiency of operation of the network is improved, and implementation of services and functions is simplified relative to a CN/RAN split. A service of a service-based architecture may be referred to herein as a "service device," which can refer to a device or cloud environment implementing the service or to the service itself.

A network entity referred to as a middlebox may provide security or other functions for endpoint devices of a wireless network. For example, a middlebox may include a firewall, an intrusion detection system, a data loss protection system, a proxy, or the like. A middlebox may provide compliance, load balancing, personal data protection, troubleshooting, Internet protocol filtering, improved content delivery, monitoring for cybersecurity, or the like.

Challenges may arise in the implementation of a middlebox in a wireless network, particularly when traffic is end-to-end protected, e.g., using Transport Layer Security (TLS). For example, it may be difficult for a middlebox to perform intended actions against the end-to-end encrypted traffic. The middlebox may require a security association with an endpoint (e.g., a UE or a service) and may obtain authorization of its actions by the endpoint. Establishing the security association may involve protocol overhead and as such may involve difficultly in scaling in the presence of a large number of flows passing through the middlebox. Furthermore, authorization policies may vary dynamically and may be defined by another entity (e.g., a security policy control function) in a network, which introduces additional signaling between the middlebox and the endpoints.

Aspects of the present disclosure generally relate to middlebox implementation in a wireless network. Some aspects more specifically relate to middlebox implementation in a service-based architecture using a security service. In some aspects, a network entity (e.g., a middlebox) may receive, from a security service, a security policy that indicates one or more authorization policies for the network entity. The network entity may forward communications on a communication link in accordance with the security policy. In some aspects, the security service may handle security key provisioning for the middlebox and endpoint key provisioning for endpoint devices of the communication link. In some aspects, the security policy for a given service may be associated with at least one of a type of the service or a requirement of the service. For example, the security policy may be defined per service type and/or per service requirement.

Aspects of the present disclosure may be used to realize one or more of the following potential advantages. In some aspects, by providing the security policy using the security service, scalability is provided relative to managing middlebox configuration and deployment for individual middleboxes or services at a mobile network operator or implementer of the middlebox. In some aspects, by performing security and endpoint key provisioning at the security service, scalability is provided relative to performing such key provisioning at a core network device. In some aspects, by defining security policies per service type and/or requirement, flexibility is provided for various middlebox implementations across different service types and requirements.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, IoT connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a RAN.

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (Dus), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a MAC layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more Cus, one or more Dus, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110

(for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

As indicated above, FIG. 1 is provided as an example. Other examples may differ from what is described with regard to FIG. 1.

Figure 2:
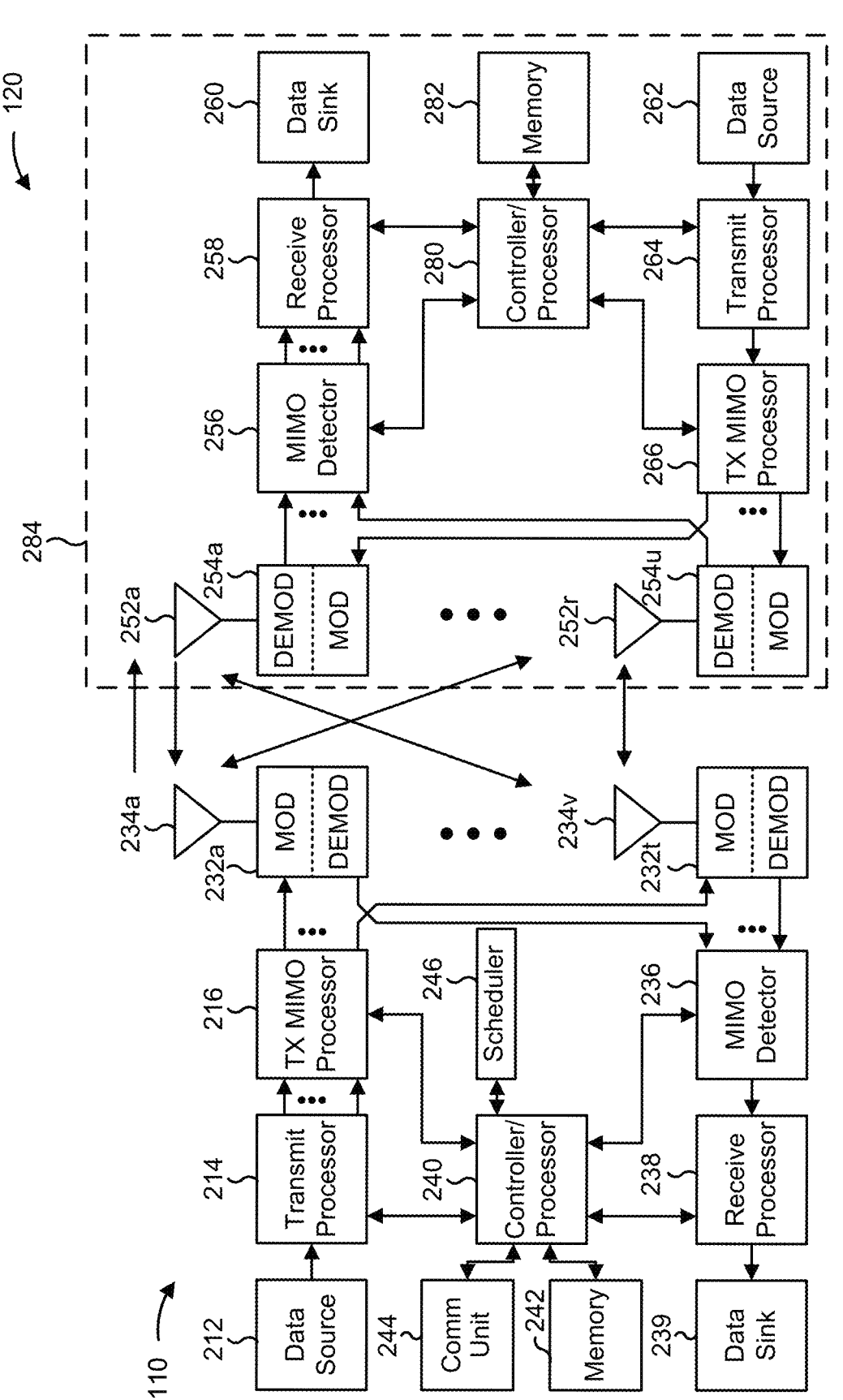
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, and/or a scheduler 246, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, and/or a memory 282, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
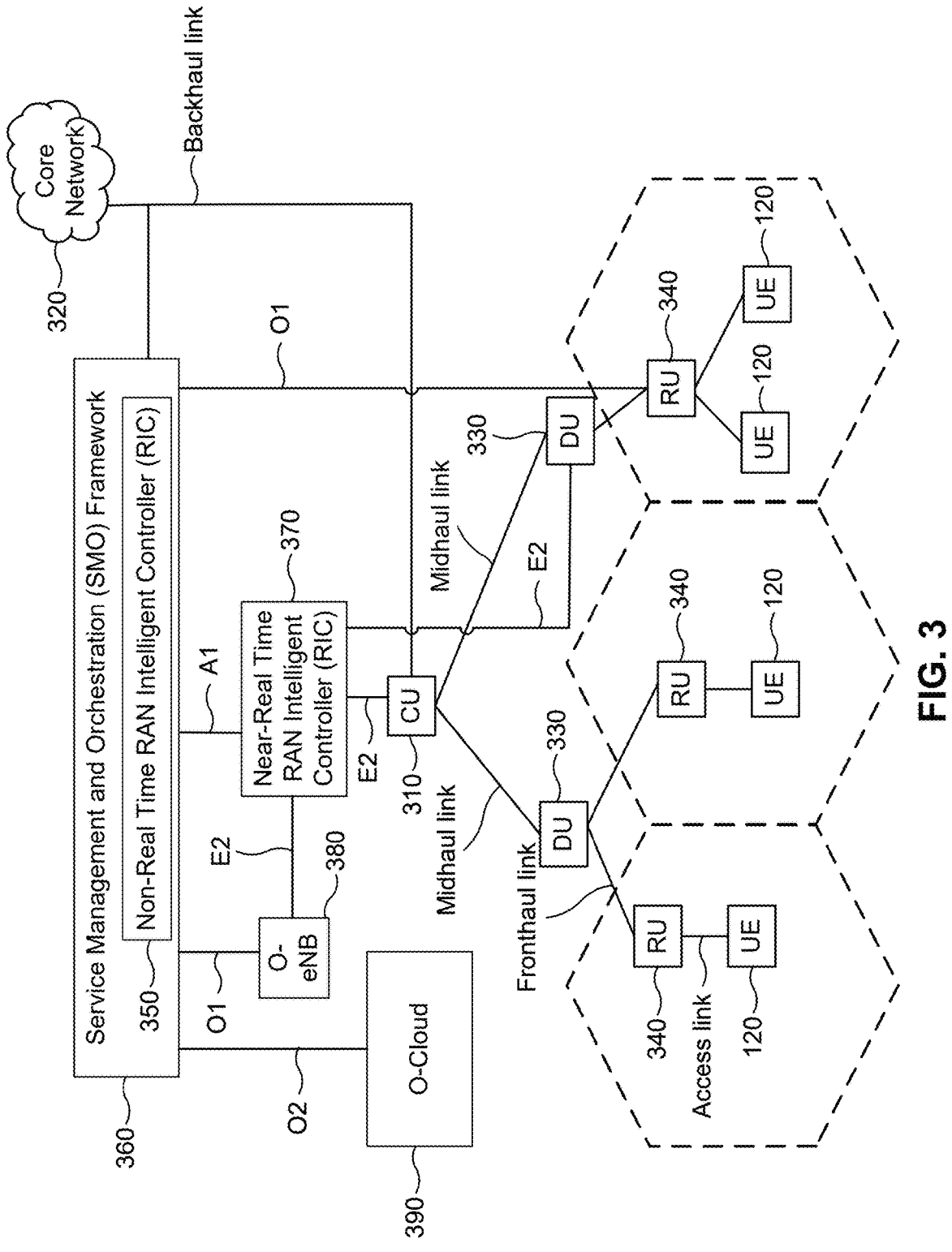
FIG. 3 is a diagram illustrating an example disaggregated base station architecture, in accordance with the present disclosure.

FIG. 3 is a diagram illustrating an example disaggregated base station architecture 300, in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with middlebox security, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 700 of FIG. 7, process 800 of FIG. 8, process 900 of FIG. 9, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a nontransitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 700 of FIG. 7, process 800 of FIG. 8, process 900 of FIG. 9, or other processes as described herein. In some examples, executing instructions may include running the instructions, converting the instructions, compiling the instructions, and/or interpreting the instructions, among other examples.

As indicated above, FIG. 3 is provided as an example. Other examples may differ from what is described with regard to FIG. 3.

Figure 4:
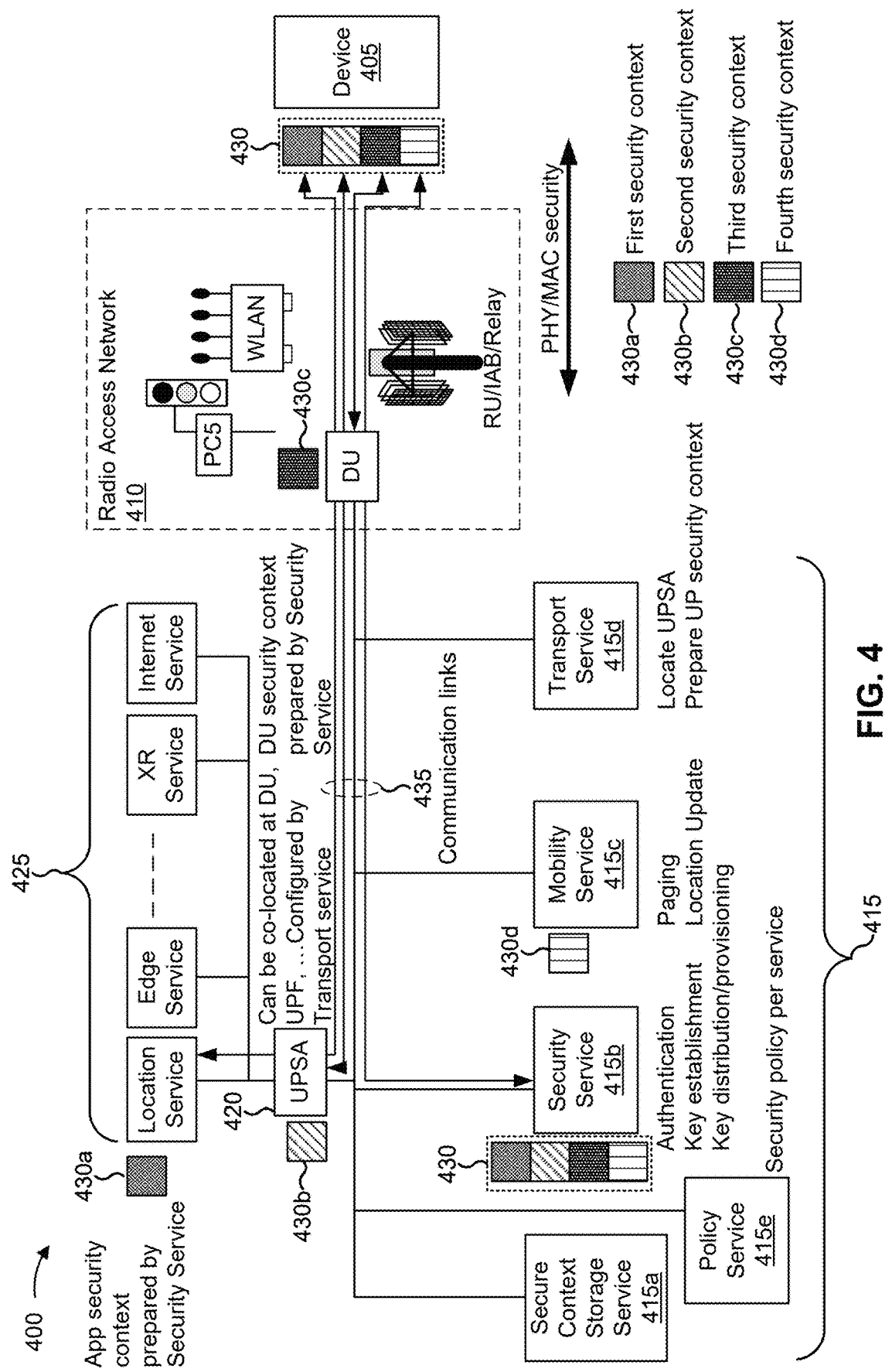
FIG. 4 is a diagram of an example of a service-based architecture, in accordance with the present disclosure.

FIG. 4 is a diagram of an example 400 of a service-based architecture, in accordance with the present disclosure. As shown, the example 400 may include a device 405 (e.g., a UE 120, a network node 110, or another device capable of communicating via a RAN), a RAN 410, a set of horizontal service devices 415, a user plane security anchor (UPSA) 420, and a set of vertical service devices 425. Reference to a service can also refer to a service device on or in connection with which the service is implemented.

The proliferation of cloud networks facilitates deployment of a service-based architecture for wireless networks, such as 6G networks. For example, a cloud-native platform may enable a merger of core network (CN) services (e.g., functions) and radio access network (RAN) services (e.g., functions), which may simplify protocols and reduce duplication of services across the CN and the RAN. A service-based architecture may include horizontal service devices 415 (which may refer to or include essential or common services for network access), a RAN 410, and a set of vertical service devices 425 (which may be referred to or include applications). A horizontal service device 415 or a vertical service device 425 may be configured with an interface such as an application programming interface (API), and may be implemented by a service server, which may be a device or a cloud implementation (e.g., a virtual machine). A vertical service device 425 or a node of the RAN 410 may interact with a horizontal service device 415 (such as horizontal service device 415a, 415b, 415c, 415d, or 415e) using the interface. A service-based architecture may differ from a CN-based architecture in that services or functions related to a given functionality (such as mobility) may be deployed and/or performed by a single independent horizontal service device 415 rather than being integrated into a CN function (e.g., an access and mobility management function (AMF), a user plane function (UPF), a session management function (SMF), or another core network function) and a RAN node. For example, rather than a CN function and a RAN node communicating with one another to execute a mobility operation for a UE or a DU, the DU may interface with a mobility service, which may handle selection of a target DU and configuration or other signaling related to the mobility operation.

As shown, the RAN 410 may include a DU (e.g., network node 110, DU 330), a wireless local area network node, a physical radio interface (e.g., network node 110) (illustrated, for example, as an IAB, an RU 340, or a relay), or the like. For example, the RAN 410 may include one or more gNBs. The RAN 410 may implement communication via one or more RATs, such as PC5 for sidelink communication (where PC5 may be considered part of another RAT), 4G, 5G, 6G, another RAT, or a combination thereof.

The set of horizontal service devices 415 may include, for example, a secure context storage service device 415a, a security service device 415b, a mobility service device 415c, a transport service device 415d, and/or a policy service device 415e. The secure context storage service device 415a may store contexts, such as security contexts or other forms of context, used during operation of the RAN 410, the horizontal service devices 415, or the vertical service devices 425. A context may include a set of information that is associated with a specific device or service. For example, a UE context may include a set of information and parameters associated with a specific UE. A security context, such as a user-plane security context, may include a set of security-related parameters associated with a specific device 405, a specific service device 415/425, or a combination thereof. For example, a security context may indicate security keys and/or other parameters used for secure communication between two parties in the service-based architecture.

The security service device 415b may perform operations related to maintaining a secure connection between the device 405 and one or more service devices 415/425 of the service-based architecture. For example, the security service device 415b may perform authentication of the device 405 or a service device 415/425. As another example, the security service device 415b may perform key establishment for a device 405 or service device 415/425. As another example, the security service device 415b may perform key distribution or provisioning associated with establishment or updating of security for a device 405 and/or service device

415/425. In some aspects, the security service device 415b may prepare a security context, such as a user-plane security context, for the device 405.

The mobility service device 415c may perform operations related to mobility of devices 405, such as paging, location updating, handover preparation, identification of target DUs, or the like. The transport service device 415 may locate a UPSA 420 for a device 405 and/or may prepare a user-plane security context (which may or may not include the security context described above) for the device 405.

In some examples, a device 405 may communicate with a given service device 415/425 using a security context associated with the device 405 and that service device 415/425. This is illustrated by a square with a given hatch or fill at the device 405, and a corresponding square with a given hatch or fill at the service device 415/425. In the example of FIG. 4, the device 405 is associated with a set of security contexts 430a, 430b, 430c, and 430d (collectively referred to as security contexts 430). Although the set of security contexts 430 in FIG. 4 is shown to include four security contexts, it should be understood that a greater or lesser number of security contexts may be included in the set of security contexts 430 in other examples.

For example, the device 405 may communicate with a mobility service device 415c using a security context 430d illustrated by a vertical striped fill. As another example, the device 405 may communicate with a DU of the RAN 410 using a security context 430c. As another example, the device 405 may communicate with the UPSA 420 using a security context 430b. As another example, the device 405 may communicate with the location service device 425 using a security context 430a. Furthermore, the security service device 415b may manage these security contexts 430a, 430b, 430c, 430d. Therefore, all of these security contexts 430a, 430b, 430c, and 430d (represented as squares with corresponding hatches or fills) are illustrated at the security service device 415b. Physical and MAC layer security may be provided between the device 405 and the RAN 410.

The horizontal service devices 415 may perform network functions, which may be used across vertical service devices 425. For example, the vertical service devices 425 (which may include, for example, a location service, a voice service, an edge service, an XR service, an Internet service, or the like) may correspond to applications which a device 405 may communicate with. The horizontal service devices 415 may provide network functions to support communication between the device 405 and the vertical service devices 425. Thus, the horizontal service devices 415 may be referred to as horizontal services, and the vertical service devices 425 may be referred to as vertical services. The UPSA 420 may handle user-plane security service device functions, such as key storage for a visited network or service device 425.

The device 405 may communicate with a service, such as a service device 415 or a service device 425, via a communication link 435. For example, the device 405 and the service may establish an end-to-end connection on the communication link 435. In some aspects, the communication link 435 may incorporate end-to-end confidentiality or integrity, such as via security and/or encryption. For example, the security service device 415b may provide security keys for the device 405 and the service, and the device 405 and the service may configure security using the security keys. Aspects described herein provide for configuration of a network entity such as a middlebox on the communication link 435, as described with regard to FIG. 5.

As indicated above, FIG. 4 is provided as an example. Other examples may differ from what is described with regard to FIG. 4.

Figure 5:
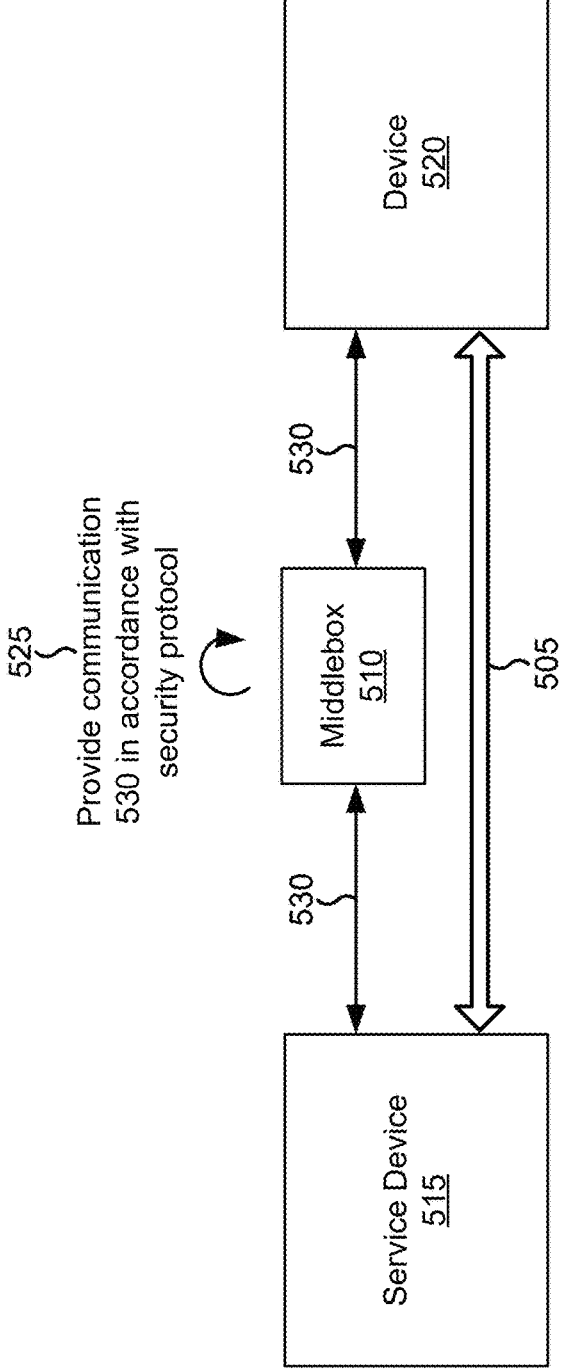
FIG. 5 is a diagram illustrating an example of a communication link incorporating a middlebox, in accordance with the present disclosure.

FIG. 5 is a diagram illustrating an example 500 of a communication link 505 incorporating a middlebox 510, in accordance with the present disclosure. The middlebox 510 is an example of a network entity that may be configured on the communication link 505 to perform "man-in-the-middle" (MitM) operations, and/or regulatory actions for communications on the communication link 505.

As shown, the communication link 505 is between a service device 515 (e.g., network node 110, DU 330, RU 340, horizontal service device 415, or vertical service device 425) and a device 520 (e.g., UE 120, network node 110, DU 330, RU 340, horizontal service device 415, or vertical service device 425). In some examples, the service device 515 may be a device, such as a server, configured to provide a service. In some aspects, the middlebox 510 may act as an authorized MitM on the communication link 505. For example, the middlebox 510 may perform operations related to operational and/or regulatory needs, such as policy enforcement, quality-of-service (QoS) optimization, and/or quality-of-experience (QoE) optimization. As another example, the middlebox 510 may enable in-network caching that is transparent to the device 520 (e.g., a UE).

As shown by reference number 525, the middlebox 510 may receive communications 530 on the communication link 505, and may transmit the communications 530 on the communication link 505 in accordance with a security policy. Signaling related to implementing the security protocol at the middlebox 510 is described in connection with FIG. 6.

In some aspects, the middlebox 510 may transmit the communication 530 in accordance with a transport protocol such as a transport-layer middlebox security protocol (TLMSP). For example, the middlebox 510 may modify, insert, or remove information of the communication 530 in accordance with the transport protocol, where the security protocol defines which information can be modified, inserted, or removed. For example, the transport protocol may implement a handshake protocol in which the service device 515 and the device 520 communicate with one another to identify a protocol version, a number of contexts for the middlebox 510, one or more purposes for the number of contexts, a granted access privilege level for the middlebox 510, and/or a cryptographic algorithm suite to use for the middlebox 510. In some examples, a security service (e.g., security service device 415*b*, not illustrated in FIG. 5) may provide security keys for the middlebox 510 and/or endpoint keys for the service device 515 and/or the device 520. Additionally, or alternatively, a transport service (e.g., transport service device 415*d*, not illustrated in FIG. 5) may identify (e.g., configure) a location for the middlebox 510. User-plane communication between the service device 515 and the device 520 may use the transport protocol. For example, the service device 515 (e.g., a server implementing the service device 515) and the device 520 (e.g., a high-level operating system of the device 520) may support the transport protocol.

In some aspects, the communication 530 may include a header. For example, a transmitter of the communication 530 (such as the service device 515 or the device 520) may insert the header. As another example, a gateway associated with the communication link (such as a gateway between a UE and the service device 515) may insert the header. In some aspects, the header may be inserted between an Internet Protocol (IP) layer of the transmitter and a transport layer of the transmitter. In some aspects, the transmitter may insert the header after receiving a protocol data unit (PDU) from an upper layer of the transmitter. The middlebox 510 may parse the header (such as at a layer of the middlebox 510 referred to as a shim layer) and/or may insert, remove, or update the header according to authorization policies of the middlebox 510, as described with regard to FIG. 6. A receiver of the communication 530 (e.g., the device 520 or the service device 515) may remove the header from the communication 530 before transmitting the communication 530 (e.g., the received PDU) to an upper layer of the receiver. In some aspects, the header or the communication 530 may be transported over a user datagram protocol (UDP) link and/or an IP link.

The header may include content. In some aspects, the content may be inserted by the transmitter. Additionally, or alternatively, the content may be inserted by the middlebox 510 (e.g., in accordance with a security policy). For example, the header may include one or more of: QoE information (e.g., a parameter indicating a QoE associated with the transmitter or the communication link 505), QoS information (e.g., a parameter indicating a QoS associated with the transmitter or the communication link 505), priority information (e.g., a parameter indicating a priority of the communication 530), a delay value (e.g., a parameter indicating a delay associated with the transmitter or the communication link 505), a round-trip time (e.g., a parameter indicating a round-trip time associated with the communication link 505), a jitter (e.g., a parameter indicating a deviation from expected arrival time associated with the communication link 505), or a bandwidth (e.g., a parameter indicating a bandwidth of the transmitter or the communication link 505). In some aspects, content of the header may be based at least in part on a purpose of the middlebox 510 (that is, a purpose of the network entity). For example, if the middlebox 510 performs performance monitoring, the header may include one or more of the QoE information, the QoS information, the delay value, the round-trip time, or the jitter. Implementing the header to provide information regarding the communication link 530 may enable middlebox operation without impact at a higher-layer operating system (HLOS) of the device 520 (for example, if the header is inserted or removed by a gateway when the device 520 is a UE).

In some aspects, the middlebox 510 may be configured as a proxy (such as a hypertext transfer protocol (HTTP) proxy or a QUIC proxy) associated with a tunneling protocol such as a QUIC-based protocol. The tunneling protocol may provide for a tunnel such as a QUIC-based tunnel to be configured. In this example, the middlebox 510 may be configured as a multiplexed application substrate over QUIC encryption (MASQUE) proxy. For example, the service device 515 and the device 520 may communicate with the middlebox 510 using an the tunneling protocol, which may, for example, include an application-layer tunneling protocol. The transmitter may transmit the communication 530 via the tunnel, and the middlebox 510 may transmit the communication in accordance with one or more security policies via the tunnel. This approach provides flexibility relative to header-based or TLMSP approaches, particularly when implemented at the HLOS and (proxy) server (e.g., transparently to a modem).

In some examples, the middlebox 510 may implement multi-context transport layer security (mcTLS), such as using techniques described above. This may provide middlebox operation with no or minimal protocol and packet overhead, such as by avoiding multiple encapsulation and/or tunneling, and may avoid or minimize multiple iterations of security negotiation and setup protocols for a single end-to-end connection. Additionally, or alternatively, the middlebox 510 may use a packet (or PDU) format that can be used or updated by multiple entities, such as in accordance with a security profile as described below. The packet (or PDU) format may include mutable fields (which can be changed or updated after being created) and immutable fields (which cannot be changed or updated after being created). In some aspects, the middlebox 510, service device 515, or device 520 may support end-to-end security setup and end-to-middle security key setup, such that no separate end-to-middlebox negotiation or protocol is needed. For example, the end-to-middlebox negotiation may be performed during end-to-end setup or may be configured by the network (such as a security service). The middlebox 510 may add or update mutable fields, which may not be end-to-end protected, but which may be end-to-end verifiable using the security keys described above.

In some aspects, the middlebox 510 may support TLMSP dynamic discovery and handshake protocols. This may enable read and modification operations on the communication 530, as well as auditable insertions (such as of new data, originating at the middlebox 510) and auditable deletions. Furthermore, the middlebox 510 may support flexible message formats, allowing adaptation to varying network condition. As another example, the middlebox 510 may support on-path middlebox discovery, improved sequence number handling, security measures against security vulnerabilities, defined cipher suites, transport layer security (TLS) fallback mechanisms, and authentication extensions.

As indicated above, FIG. 5 is provided as an example. Other examples may differ from what is described with regard to FIG. 5.

Figure 6:
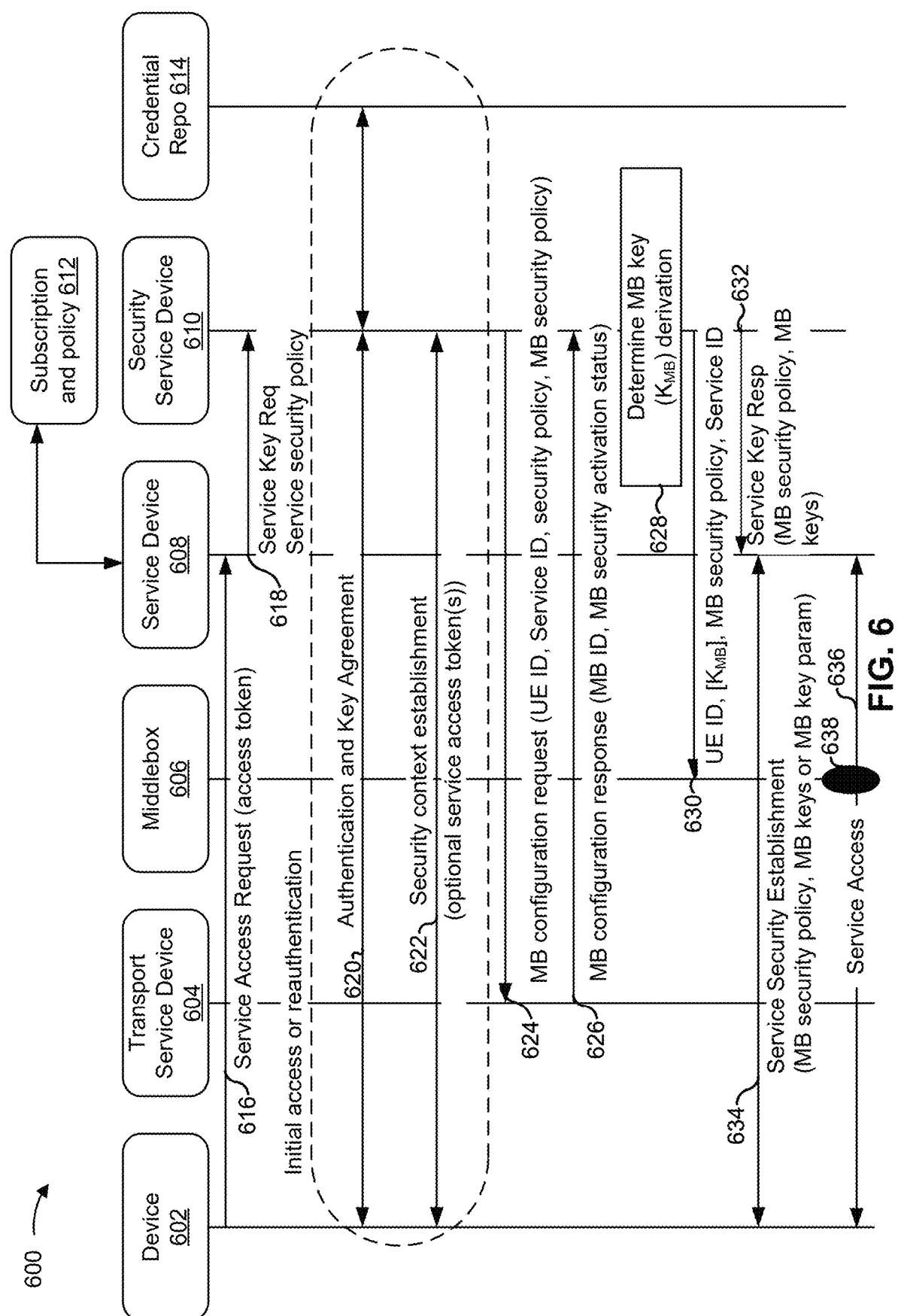
FIG. 6 is a diagram illustrating an example of middlebox implementation in a wireless network, in accordance with the present disclosure.

FIG. 6 is a diagram illustrating an example 600 of middlebox implementation in a wireless network, in accordance with the present disclosure. Example 600 includes a device 602 (e.g., UE 120, network node 110, device 405, device 520), a transport service device 604 (e.g., network node 110, transport service device 415*d*, service device 515), a network entity referred to as a middlebox 606 (e.g., network node 110, middlebox 510), a service device 608 (e.g., network node 110, horizontal service device 415, vertical service device 425, service device 515), a security service device 610 (e.g., network node 110, security service device 415*b*, service device 515), a subscription and policy entity 612 associated with the security service device 610, and a credential repository 614. In some aspects, the middlebox 606 may be co-located with a user plane function or a service that implements a user plane function.

While examples 500 and 600 are described with regard to a single middlebox 510/606 on a path between the device 602 and the service device 608, aspects described herein can be implemented for any number of middleboxes on the path. In some examples, the service device 608 may include a service and/or one or more applications running on the service device 608.

The middlebox 606 may apply (e.g., enforce) a middlebox security policy to a connection between the device 602 and the service device 608. For example, the middlebox 606 may apply the middlebox security policy dynamically (e.g., according to conditions on the connection). In some aspects, the middlebox security policy may indicate QoS information, QoE information, or the like. For example, the middlebox security policy may indicate a QoS threshold or a QoE threshold. As another example, the middlebox security policy may indicate a QoS target or a QoE target.

As shown by reference number 616, the device 602 may transmit, and the service device 608 may receive, a service access request. The service access request may include a request for the device 602 to access the service device 608, such as an application associated with the service device 608. As shown, the service access request may include an access token. The access token may include information related to requesting access to the service device 608, such as a credential associated with the device 602 and/or the service device 608. Thus, the service device 608 may initiate a service access with regard to the device 602.

As shown by reference number 618, the service device 608 may transmit a service key request to the security service device 610. The service key request may request a security key for the service device 608, such as for a security context between the device 602 and the service device 608. As further shown, the service key request may indicate a service security policy. As shown by reference number 620, two or more of the device 602, the service device 608, and/or the security service device 610 may perform authentication and key agreement. Authentication may include obtaining an authentication parameter from the device 602 and/or the service device 608 and verifying the authentication parameter against an authentication policy. Key agreement may include signaling to establish a security key to be used by the device 602 and/or the service device 608 for establishment of service security, as described below. For example, the authentication may include proof of device identity based on device credentials, such as a universal integrated circuit card (UICC) (e.g., an embedded UICC (eUICC) or an integrated UICC (iUICC) credential).

As shown by reference number 622, the device 602, the service device 608, and/or the security service device 610 may perform security context establishment. Security context establishment may include establishing a security context between the device 602 and the service device 608, such as based on information obtained from the security service device 610. The information obtained from the security service device 610 may include, for example, a security key, information defining the security context, or the like.

As shown by reference number 624, the security service device 610 may transmit, and the transport service device 604 may receive, a middlebox configuration request. As shown, the middlebox configuration request may indicate an identifier of the device 602 (e.g., a UE identifier), an identifier of the service device 608, a security policy for the service device 608, and a middlebox security policy for the middlebox 606.

The transport service device 604 may identify the middlebox 606. For example, the transport service device 604 may identify the middlebox 606 based on a service requirement (such as a security service requirement, a QoS requirement, or the like), a mobility pattern, a network policy, or the like. In some aspects, the transport service device 604 may configure a forwarding rule such that communications between the device 602 and the service device 608 are forwarded via the middlebox 606. For example, the transport service device 604 may configure the forwarding rule in a transport network.

As shown by reference number 626, the transport service device 604 may transmit, and the security service device 610 may receive, a middlebox configuration response. As shown, the middlebox configuration response may optionally include an identifier of the middlebox 606, and may indicate an activation status of middlebox security of the middlebox 606. For example, in some aspects, the transport service device 604 may provide an identifier of the middlebox 606

(for example, if the identifier is used by a protocol associated with the middlebox 606). Thus, the security service device 610 may retrieve middlebox information from the transport service device 604.

As shown by reference number 628, the security service device 610 may determine a security key for the middlebox 606 ($K_{MB}$), or may determine a derivation for the security key. For example, the middlebox 606 may use the security key to sign insertions, removals, or modifications to communications provided by the middlebox 606. In some aspects, each operation (such as insertion, removal, read, write, or modification) may be associated with a respective security key. In this way, a recipient can differentiate whether the middlebox 606 has performed an authorized action using the corresponding security key. Otherwise, if a single security key is used to perform all those operations, authorization may be more difficult to determine (though overhead and complexity may be lower).

A recipient of the communication may use an endpoint key corresponding to the security key for the middlebox 606 to verify the insertion, removal, or modification. In some aspects, the security service device 610 may generate the one or more security keys for the middlebox 606. As another example, the security service device 610 may generate a set of middlebox key parameters from which the security key, or an endpoint key usable by the device 602 or the service device 608 in association with the security key, are derivable. The security service device 610 may provide the security key, the endpoint key, or the set of middlebox key parameters, as described below.

In some aspects, the security key or the endpoint key may be service-specific. In some other aspects, the security key or the endpoint key may be shared across multiple services. In some aspects, the security service device 610 may determine a security key or endpoint key based on a middlebox security policy or a service security policy. For example, the security service device 610 may determine security key or an endpoint key that is compatible with a set of authorized actions indicated by a middlebox security policy, or that provides permissions or authorized actions that are in accordance with a service security policy of the service device 608.

As shown by reference number 630, the security service device 610 may provide an identifier of the device 602 (such as a UE identifier), one or more security keys for the middlebox 606, a service identifier associated with the service device 608, and information identifying the middlebox security policy to the middlebox 606.

In some aspects, the middlebox security policy may be set by a mobile network operator. As described above, the middlebox security policy, in some aspects, may be defined per service, such as per service type or per service requirement. A middlebox security policy may indicate one or more authorization policies. An authorization policy may indicate whether or not the middlebox 606 is authorized to perform one or more actions. For example, an authorization policy may indicate an authorized action at the middlebox 606. As another example, an authorization policy may indicate an entity authorized to interact with the middlebox 606 (such as the device 602). As another example, an authorization policy may indicate an authorized service associated with the network entity (such as the service device 608).

An authorized action may include a read action, a read-and-write action, a write action, or the like. As one example, a middlebox security policy may indicate that the middlebox 606 is authorized to read and write a header of a communication, to read content of the communication, and to write content of the communication (e.g., for caching). Authorized actions may be associated with respective keys, as described above.

An authorized entity may include an entity that is authorized to communicate with or configure the middlebox 606. For example, in some examples, an endpoint key for the middlebox 606 may be shared only with the device 602 or only with the service device 608, and in other examples, endpoint keys may be shared with the device 602 and the service device 608. As another example, in some examples, a service device 608 may be permitted to request information or an action from the middlebox 606. As another example, in some examples, a device 602 may be authorized to request information or an action from the middlebox 606. An authorization policy may indicate which entities (e.g., devices, services) are authorized to request information or actions, receive endpoint keys, or the like. An authorized service may be a service that is authorized to transmit or receive communications via a link on which the middlebox 606 is configured.

As shown by reference number 632, the security service device 610 may transmit, and the service device 608 may receive, a service key response. For example, the security service device 610 may transmit the service key response in response to the service key request shown by reference number 618. As shown, the service key response may indicate the middlebox security policy for the middlebox 606 and a set of endpoint keys. In some aspects, the service key response may indicate a set of middlebox key parameters, and the service device 608 may derive the set of endpoint keys using the set of middlebox key parameters and a root key shared between the service device 608 and the security service device 610.

As shown by reference number 634, the device 602, the middlebox 606, and the service device 608 may perform service security establishment. This may involve exchanging the middlebox security policy, endpoint keys, or parameters used to derive the middlebox keys. For example, the device 602 may receive the middlebox security policy and/or the set of endpoint keys in connection with service security establishment. In some aspects, the device 602 may receive a set of middlebox key parameters, and the device 602 may derive the set of endpoint keys using the set of middlebox key parameters and a root key shared between the device 602 and the security service device 608.

As shown by reference number 636, the device 602 may access the service. For example, the device 602 may transmit or receive a communication (e.g., communication 530), which the middlebox 606 may provide according to the middlebox security policy, as indicated by reference number 638. For example, the middlebox 606 may modify one or more mutable fields of the communication in accordance with a transport layer middlebox security protocol or other middlebox protocol described with regard to FIG. 5 (e.g., MASQUE, TLMSP, or the like). As another example, the middlebox 606 may insert, remove, or update a header in accordance with the middlebox security policy. In some aspects, the middlebox 606 may sign any modifications, insertions, or removals using the security key, such that the device 602 or the service device 608 can verify that these modifications, insertions, or removals were authorized using an endpoint key. Thus, the middlebox 616 may transmit the communication including information generated using the security key.

FIG. 7 is a diagram illustrating an example process 700 performed, for example, at a network entity or an apparatus of a network entity, in accordance with the present disclosure. Example process 700 is an example where the apparatus or the network entity (e.g., middlebox 510, middlebox 606) performs operations associated with middlebox security in a wireless network.

As shown in FIG. 7, in some aspects, process 700 may include receiving, from a security service, a middlebox security policy, wherein the middlebox security policy is associated with a UE and a service, and wherein the middlebox security policy indicates a set of authorization policies relating to one or more of the UE or the service (block 710). For example, the network entity (e.g., using input component 1040, depicted in FIG. 10) may receive, from a security service, a middlebox security policy, wherein the middlebox security policy is associated with a UE and a service, and wherein the middlebox security policy indicates a set of authorization policies relating to one or more of the UE or the service, as described above.

As further shown in FIG. 7, in some aspects, process 700 may include receiving a communication on a communication link between the UE and the service (block 720). For example, the network entity (e.g., using input component 1040, depicted in FIG. 10) may receive a communication on a communication link between the UE and the service, as described above.

As further shown in FIG. 7, in some aspects, process 700 may include transmitting the communication in accordance with the middlebox security policy (block 730). For example, the network entity (e.g., using output component 1050, depicted in FIG. 10) may transmit the communication in accordance with the middlebox security policy, as described above.

Process 700 may include additional aspects, such as any single aspect or any combination of aspects described below and/or in connection with one or more other processes described elsewhere herein.

In a first aspect, the middlebox security policy is associated with at least one of a type of the service or a requirement associated with the service.

In a second aspect, alone or in combination with the first aspect, the middlebox security policy is defined by a mobile network operator associated with the security service.

In a third aspect, alone or in combination with one or more of the first and second aspects, receiving the middlebox security policy further comprises receiving a security key associated with the middlebox security policy, and wherein transmitting the communication further comprises transmitting the communication including information generated using the security key.

In a fourth aspect, alone or in combination with one or more of the first through third aspects, the set of authorization policies includes one or more of an authorization policy indicating an authorized action at the network entity, an indication of an entity authorized to interact with the network entity, or an indication of an authorized service associated with the network entity.

In a fifth aspect, alone or in combination with one or more of the first through fourth aspects, transmitting the communication in accordance with the middlebox security policy further comprises modifying one or more mutable fields of the communication in accordance with a transport layer middlebox security protocol.

In a sixth aspect, alone or in combination with one or more of the first through fifth aspects, the communication as received by the network entity or as provided by the network entity includes a header, and wherein information in the header is based at least in part on a purpose associated with the network entity.

In a seventh aspect, alone or in combination with one or more of the first through sixth aspects, the information in the header includes at least one of quality-of-experience information, quality-of-service information, priority information, a packet type, a delay value, a round-trip time, a jitter, or a bandwidth.

In an eighth aspect, alone or in combination with one or more of the first through seventh aspects, transmitting the communication in accordance with the middlebox security policy comprises inserting, removing, or updating the header in accordance with the middlebox security policy.

In a ninth aspect, alone or in combination with one or more of the first through eighth aspects, transmitting the communication in accordance with the middlebox security policy comprises modifying, inserting, or removing information of the communication in accordance with a middlebox protocol.

In a tenth aspect, alone or in combination with one or more of the first through ninth aspects, the middlebox security policy defines which information of the communication can be modified, inserted, or removed.

In an eleventh aspect, alone or in combination with one or more of the first through tenth aspects, the middlebox protocol comprises a transport layer middlebox security protocol.

In a twelfth aspect, alone or in combination with one or more of the first through eleventh aspects, receiving the communication further comprises receiving the communication in accordance with a QUIC-based tunnel, wherein the network entity is configured as a proxy associated with the QUIC-based tunnel.

In a thirteenth aspect, alone or in combination with one or more of the first through twelfth aspects, the network entity comprises a middlebox.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, at a security service or an apparatus of a security service, in accordance with the present disclosure. Example process 800 is an example where the apparatus or the security service (e.g., security service device 610) performs operations associated with middlebox security in a wireless network.

As shown in FIG. 8, in some aspects, process 800 may include receiving, from a transport service, an indication of a network entity associated with a middlebox security policy, wherein the middlebox security policy is associated with a UE and a service, and wherein the middlebox security policy indicates a set of authorization policies relating to one or more of the UE or the service (block 810). For example, the security service (e.g., using input component 1040, depicted in FIG. 10) may receive, from a transport service, an indication of a network entity associated with a middlebox security policy, wherein the middlebox security policy is associated with a UE and a service, and wherein the middlebox security policy indicates a set of authorization policies relating to one or more of the UE or the service, as described above.

As further shown in FIG. 8, in some aspects, process 800 may include providing, to the network entity, the middlebox security policy (block 820). For example, the security service (e.g., using output component 1050, depicted in FIG.

10) may provide, to the network entity, the middlebox security policy, as described above.

Process 800 may include additional aspects, such as any single aspect or any combination of aspects described below and/or in connection with one or more other processes described elsewhere herein.

In a first aspect, process 800 includes providing, to the network entity, a security key, wherein communications modified by the network entity are based at least in part on the security key.

In a second aspect, alone or in combination with the first aspect, process 800 includes providing information associated with the security key to the service or the UE.

In a third aspect, alone or in combination with one or more of the first and second aspects, the information associated with the security key comprises at least one of an endpoint key, corresponding to the security key, for the service or the UE, or a root key from which the endpoint key is derivable.

In a fourth aspect, alone or in combination with one or more of the first through third aspects, process 800 includes generating the security key.

In a fifth aspect, alone or in combination with one or more of the first through fourth aspects, process 800 includes transmitting, to the transport service, information regarding the middlebox security policy, wherein the indication of the network entity associated with the middlebox security policy is in response to the information regarding the middlebox security policy.

In a sixth aspect, alone or in combination with one or more of the first through fifth aspects, the information regarding the middlebox security policy includes at least one of an identifier of the UE, an identifier of the service, or another middlebox security policy associated with the security service.

In a seventh aspect, alone or in combination with one or more of the first through sixth aspects, the set of authorization policies includes one or more of an authorization policy indicating an authorized action at the network entity, an indication of an entity authorized to interact with the network entity, or an indication of an authorized service associated with the network entity.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, at a service or an apparatus of a service device, in accordance with the present disclosure. Example process 900 is an example where the apparatus or the service device (e.g., service device 515, service device 608) performs operations associated with middlebox security in a wireless network.

As shown in FIG. 9, in some aspects, process 900 may include initiating a service access with regard to a UE (block 910). For example, the service device (e.g., using output component 1050, depicted in FIG. 10) may initiate a service access with regard to a UE, as described above.

As further shown in FIG. 9, in some aspects, process 900 may include transmitting, to a security service device, a service key request (block 920). For example, the service (e.g., using communication component 1060, depicted in FIG. 10) may transmit, to a security service device, a service key request, as described above.

As further shown in FIG. 9, in some aspects, process 900 may include receiving, from the security service device, at least one of: an endpoint key associated with a security key for a network entity, or a root key from which the endpoint key is derivable (block 930). For example, the service device (e.g., using input component 1040, depicted in FIG. 10) may receive, from the security service device, at least one of: an authorization policy associated with the network entity, an endpoint key associated with a security key for the network entity, a root key from which the endpoint key is derivable, or one or more key derivation parameters, as described above. In some aspects, the network entity may include a middlebox such as middlebox 606. In some aspects, the root key may be one of the one or more key derivation parameters, or the root key may include the one or more key derivation parameters.

As further shown in FIG. 9, in some aspects, process 900 may include communicating with the UE via the network entity using the endpoint key (block 940). For example, the service (e.g., using communication component 1060, depicted in FIG. 10) may communicate with the UE via the network entity using the endpoint key, as described above.

Process 900 may include additional aspects, such as any single aspect or any combination of aspects described below and/or in connection with one or more other processes described elsewhere herein.

In a first aspect, process 900 includes receiving a middlebox security policy associated with the network entity.

In a second aspect, alone or in combination with the first aspect, the middlebox security policy indicates a set of authorization policies relating to one or more of the UE or the service.

In a third aspect, alone or in combination with one or more of the first and second aspects, the set of authorization policies includes one or more of an authorization policy indicating an authorized action at the network entity, an indication of an entity authorized to interact with the network entity, or an indication of an authorized service associated with the network entity.

In a fourth aspect, alone or in combination with one or more of the first through third aspects, the middlebox security policy is associated with at least one of a type of the service or a requirement associated with the service.

In a fifth aspect, alone or in combination with one or more of the first through fourth aspects, the middlebox security policy is defined by a mobile network operator associated with the security service.

In a sixth aspect, alone or in combination with one or more of the first through fifth aspects, the middlebox security policy defines which information included in communications via the network entity can be modified, inserted, or removed by the network entity.

In a seventh aspect, alone or in combination with one or more of the first through sixth aspects, the middlebox security policy defines which information of communications via the network entity can be modified, inserted, or removed by the network entity in accordance with a transport layer middlebox security protocol.

In an eighth aspect, alone or in combination with one or more of the first through seventh aspects, communicating with the UE via the network entity using the endpoint key comprises verifying one or more mutable fields of the communication using the endpoint key.

In a ninth aspect, alone or in combination with one or more of the first through eighth aspects, communicating with the UE via the network entity further comprises receiving a communication including a header, and wherein information in the header is based at least in part on a role associated with the network entity.

In a tenth aspect, alone or in combination with one or more of the first through ninth aspects, the information in the header includes at least one of quality-of-experience information, quality-of-service information, priority information, a packet type, a delay value, a round-trip time, a jitter, or a bandwidth.

In an eleventh aspect, alone or in combination with one or more of the first through tenth aspects, process 900 includes removing the header prior to transmitting the communication to an upper layer of the service.

In a twelfth aspect, alone or in combination with one or more of the first through eleventh aspects, communicating with the UE via the network entity comprises communicating in accordance with a QUIC-based tunnel, wherein the network entity is configured as a proxy associated with the QUIC-based tunnel.

In a thirteenth aspect, alone or in combination with one or more of the first through twelfth aspects, process 900 includes deriving the endpoint key using the root key.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
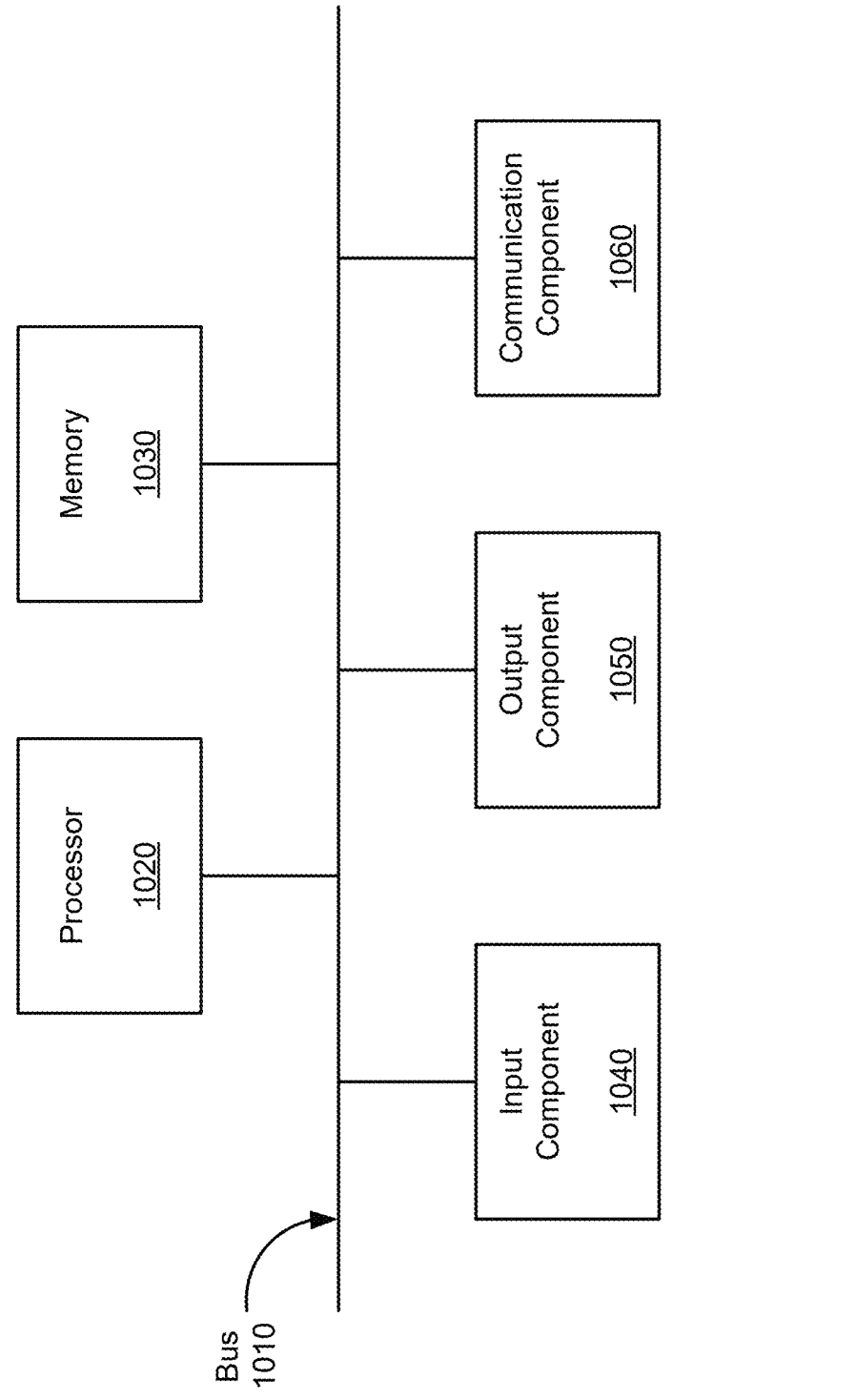
FIG. 10 is a diagram of example components of a device associated with middlebox security in a wireless network.

FIG. 10 is a diagram of example components of a device 1000 associated with middlebox security in a wireless network. The device 1000 may correspond to horizontal service device 415, vertical service device 425, middlebox 510, service device 515, device 520, middlebox 606, service device 608, or security service device 610. In some implementations, horizontal service device 415, vertical service device 425, middlebox 510, service device 515, device 520, middlebox 606, service device 608, or security service device 610 may include one or more devices 1000 and/or one or more components of the device 1000. As shown in FIG. 10, the device 1000 may include a bus 1010, a processor 1020, a memory 1030, an input component 1040, an output component 1050, and/or a communication component 1060.

The bus 1010 may include one or more components that enable wired and/or wireless communication among the components of the device 1000. The bus 1010 may couple together two or more components of FIG. 10, such as via operative coupling, communicative coupling, electronic coupling, and/or electric coupling. For example, the bus 1010 may include an electrical connection (e.g., a wire, a trace, and/or a lead) and/or a wireless bus. The processor 1020 may include a central processing unit, a graphics processing unit, a microprocessor, a controller, a microcontroller, a digital signal processor, a field-programmable gate array, an application-specific integrated circuit, and/or another type of processing component. The processor 1020 may be implemented in hardware, firmware, or a combination of hardware and software. In some implementations, the processor 1020 may include one or more processors capable of being programmed to perform one or more operations or processes described elsewhere herein.

The memory 1030 may include volatile and/or nonvolatile memory. For example, the memory 1030 may include RAM, ROM, a hard disk drive, and/or another type of memory (e.g., a flash memory, a magnetic memory, and/or an optical memory). The memory 1030 may include internal memory (e.g., RAM, ROM, or a hard disk drive) and/or removable memory (e.g., removable via a universal serial bus connection). The memory 1030 may be a non-transitory computer-readable medium. The memory 1030 may store information, one or more instructions, and/or software (e.g., one or more software applications) related to the operation of the device 1000. In some implementations, the memory 1030 may include one or more memories that are coupled (e.g., communicatively coupled) to one or more processors (e.g., processor 1020), such as via the bus 1010. Communicative coupling between a processor 1020 and a memory 1030 may enable the processor 1020 to read and/or process information stored in the memory 1030 and/or to store information in the memory 1030.

The input component 1040 may enable the device 1000 to receive input, such as user input and/or sensed input. For example, the input component 1040 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 1050 may enable the device 1000 to provide output, such as via a display, a speaker, and/or a light-emitting diode. The communication component 1060 may enable the device 1000 to communicate with other devices via a wired connection and/or a wireless connection. For example, the communication component 1060 may include a receiver, a transmitter, a transceiver, a modem, a network interface card, and/or an antenna.

The device 1000 may perform one or more operations or processes described herein. For example, a non-transitory computer-readable medium (e.g., memory 1030) may store a set of instructions (e.g., one or more instructions or code) for execution by the processor 1020. The processor 1020 may execute the set of instructions to perform one or more operations or processes described herein. In some implementations, execution of the set of instructions, by one or more processors 1020, causes the one or more processors 1020 and/or the device 1000 to perform one or more operations or processes described herein. In some implementations, hardwired circuitry may be used instead of or in combination with the instructions to perform one or more operations or processes described herein. Additionally, or alternatively, the processor 1020 may be configured to perform one or more operations or processes described herein. Thus, implementations described herein are not limited to any specific combination of hardware circuitry and software.

The number and arrangement of components shown in FIG. 10 are provided as an example. The device 1000 may include additional components, fewer components, different components, or differently arranged components than those shown in FIG. 10. Additionally, or alternatively, a set of components (e.g., one or more components) of the device 1000 may perform one or more functions described as being performed by another set of components of the device 1000.

The following provides an overview of some Aspects of the present disclosure:

Aspect 1: A method of wireless communication performed by a network entity, comprising: receiving, from a security service, a middlebox security policy, wherein the middlebox security policy is associated with a user equipment (UE) and a service, and wherein the middlebox security policy indicates a set of authorization policies relating to one or more of the UE or the service; receiving a communication on a communication link between the UE and the service; and transmitting the communication in accordance with the middlebox security policy.

Aspect 2: The method of Aspect 1, wherein the middlebox security policy is associated with at least one of a type of the service or a requirement associated with the service.

Aspect 3: The method of any of Aspects 1-2, wherein the middlebox security policy is defined by a mobile network operator associated with the security service.

Aspect 4: The method of any of Aspects 1-3, wherein receiving the middlebox security policy further comprises receiving one or more security keys associated with the middlebox security policy, and wherein transmitting the communication further comprises transmitting the communication including information generated using the one or more security keys.

Aspect 5: The method of any of Aspects 1-4, wherein the set of authorization policies includes one or more of: an authorization policy indicating one or more authorized actions at the network entity, an indication of an entity authorized to interact with the network entity, or an indication of an authorized service associated with the network entity.

Aspect 6: The method of any of Aspects 1-5, wherein transmitting the communication in accordance with the middlebox security policy further comprises modifying one or more mutable fields of the communication in accordance with a transport protocol.

Aspect 7: The method of any of Aspects 1-6, wherein the communication as received by the network entity or as provided by the network entity includes a header, and wherein content of the header is based at least in part on a purpose associated with the network entity.

Aspect 8: The method of Aspect 7, wherein the content of the header includes at least one of: quality-of-experience information, quality-of-service information, priority information, a packet type, a delay value, a round-trip time, a jitter, or a bandwidth.

Aspect 9: The method of Aspect 7, wherein transmitting the communication in accordance with the middlebox security policy comprises inserting, removing, or updating the header in accordance with the middlebox security policy.

Aspect 10: The method of any of Aspects 1-9, wherein transmitting the communication in accordance with the middlebox security policy comprises modifying, inserting, or removing information of the communication in accordance with a middlebox protocol.

Aspect 11: The method of Aspect 10, wherein the middlebox security policy defines which information of the communication can be modified, inserted, or removed.

Aspect 12: The method of Aspect 10, wherein the middlebox protocol comprises a transport layer middlebox security protocol.

Aspect 13: The method of any of Aspects 1-12, wherein receiving the communication further comprises receiving the communication in accordance with a tunneling protocol, wherein the network entity is configured as a proxy associated with the tunneling protocol.

Aspect 14: The method of any of Aspects 1-13, wherein the network entity comprises a middlebox.

Aspect 15: A method of wireless communication performed by a security service device, comprising: receiving, from a transport service device, an indication of a network entity associated with a middlebox security policy, wherein the middlebox security policy is associated with a user equipment (UE) and a service device, and wherein the middlebox security policy indicates a set of authorization policies relating to one or more of the UE or the service device; and transmitting, to the network entity, the middlebox security policy.

Aspect 16: The method of Aspect 15, further comprising: providing, to the network entity, one or more security keys, wherein communications modified by the network entity are based at least in part on a security key, of the one or more security keys, associated with the set of authorization policies.

Aspect 17: The method of Aspect 16, further comprising providing information associated with the one or more security keys to the service device or the UE.

Aspect 18: The method of Aspect 17, wherein the information associated with the one or more security keys comprises at least one of: an endpoint key, corresponding to the security key, for the service device or the UE, or a root key from which the endpoint key is derivable.

Aspect 19: The method of Aspect 16, further comprising generating the one or more security keys.

Aspect 20: The method of any of Aspects 15-19, further comprising transmitting, to the transport service device, information regarding the middlebox security policy, wherein the indication of the network entity associated with the middlebox security policy is in response to the information regarding the middlebox security policy.

Aspect 21: The method of Aspect 20, wherein the information regarding the middlebox security policy includes at least one of: an identifier of the UE, an identifier of the service device, or another middlebox security policy associated with the security service device.

Aspect 22: The method of any of Aspects 15-21, wherein the set of authorization policies includes one or more of: an authorization policy indicating one or more authorized actions at the network entity, an indication of an entity authorized to interact with the network entity, or an indication of an authorized service associated with the network entity.

Aspect 23: A method of wireless communication performed by a service device, comprising: initiating a service access with regard to a user equipment (UE); transmitting, to a security service device, a service key request; receiving, from the security service device, at least one of: an authorization policy associated with a network entity, an endpoint key associated with a security key for the network entity, or a root key from which the endpoint key is derivable, or one or more middlebox key parameters; and communicating with the UE via the network entity using the endpoint key.

Aspect 24: The method of Aspect 23, wherein the one or more middlebox key parameters comprise one or more parameters from which a security key associated with the authorization policy or an authorized action can be derived.

Aspect 25: The method of any of Aspects 23-24, further comprising receiving a middlebox security policy associated with the network entity.

Aspect 26: The method of Aspect 25, wherein the authorization policy includes one or more of: one or more authorized actions at the network entity, an indication of an entity authorized to interact with the network entity, or an indication of an authorized service associated with the network entity.

Aspect 27: The method of Aspect 25, wherein the middlebox security policy is associated with at least one of a type of the service device or a requirement associated with the service device.

Aspect 28: The method of Aspect 25, wherein the middlebox security policy is defined by a mobile network operator associated with the security service.

Aspect 29: The method of Aspect 25, wherein the middlebox security policy defines which information included in communications via the network entity can be modified, inserted, or removed by the network entity.

Aspect 30: The method of Aspect 29, wherein the middlebox security policy defines which information of communications via the network entity can be modified, inserted, or removed by the network entity in accordance with a transport protocol.

Aspect 31: The method of any of Aspects 23-30, wherein communicating with the UE via the network entity using the endpoint key comprises verifying one or more mutable fields of the communication using the endpoint key.

Aspect 32: The method of any of Aspects 23-31, wherein communicating with the UE via the network entity further comprises receiving a communication including a header, and wherein content of the header is based at least in part on a purpose associated with the network entity.

Aspect 33: The method of Aspect 32, wherein the content of the header includes at least one of: quality-of-experience information, quality-of-service information, priority information, a packet type, a delay value, a round-trip time, a jitter, or a bandwidth.

Aspect 34: The method of Aspect 32, further comprising removing the header prior to providing the communication to an upper layer of the service.

Aspect 35: The method of any of Aspects 23-34, wherein communicating with the UE via the network entity comprises communicating in accordance with a tunneling protocol, wherein the network entity is configured as a proxy associated with the tunneling protocol.

Aspect 36: The method of any of Aspects 23-35, further comprising deriving the endpoint key using the root key.

Aspect 37: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-36.

Aspect 38: An apparatus for wireless communication at a device, the apparatus comprising one or more memories and one or more processors coupled to the one or more memories, the one or more processors configured to cause the device to perform the method of one or more of Aspects 1-36.

Aspect 39: An apparatus for wireless communication, the apparatus comprising at least one means for performing the method of one or more of Aspects 1-36.

Aspect 40: A non-transitory computer-readable medium storing code for wireless communication, the code comprising instructions executable by one or more processors to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

Aspect 42: A device for wireless communication, the device comprising a processing system that includes one or more processors and one or more memories coupled with the one or more processors, the processing system configured to cause the device to perform the method of one or more of Aspects 1-36.

Aspect 43: An apparatus for wireless communication at a device, the apparatus comprising one or more memories and one or more processors coupled to the one or more memories, the one or more processors individually or collectively configured to cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a service device, comprising:
   one or more memories; and
   one or more processors, coupled to the one or more memories, configured to cause the service device to:
      initiate a service access for a connection with regard to a user equipment (UE);
      transmit, to a security service device, a service key request;
      receive, from the security service device, at least one of:
         an authorization policy associated with a network entity,
         an endpoint key associated with a security key for the network entity,
         a root key from which the endpoint key is derivable, or
         one or more middlebox key parameters;
      receive a communication from the UE via the network entity, the communication having a protocol data unit (PDU) format that includes one or more mutable fields; and
      verify, using the endpoint key, that a modification, an insertion, or a removal of the one or more mutable fields of the communication are authorized for the network entity in accordance with a middlebox security policy.

2. The apparatus of claim 1, wherein the one or more middlebox key parameters comprise one or more parameters from which a security key associated with the authorization policy or an authorized action can be derived.

3. The apparatus of claim 1, wherein the one or more processors are further configured to cause the service device to receive the middlebox security policy associated with the network entity.

4. The apparatus of claim 1, wherein the one or more processors, to cause the service device to receive the communication from the UE via the network entity, are configured to cause the service device to receive the communication in accordance with a tunneling protocol, wherein the network entity is configured as a proxy associated with the tunneling protocol.

5. The apparatus of claim 1, wherein the one or more processors are further configured to cause the service device to derive the endpoint key using the root key or the one or more middlebox key parameters.

6. The apparatus of claim 1, wherein the one or more processors configured to cause the service device to receive at least one of the authorization policy associated with the network entity, or the endpoint key, or the root key, or the one or more middlebox key parameters comprises the one or more processors configured to cause the service device to receive the authorization policy.

7. The apparatus of claim 1, wherein the one or more processors configured to cause the service device to receive at least one of the authorization policy associated with the network entity, or the endpoint key, or the root key, or the one or more middlebox key parameters comprises the one or more processors configured to cause the service device to receive the endpoint key.

8. The apparatus of claim 1, wherein the one or more processors configured to cause the service device to receive at least one of the authorization policy associated with the network entity, or the endpoint key, or the root key, or the one or more middlebox key parameters comprises the one or more processors configured to cause the service device to receive the root key.

9. The apparatus of claim 1, wherein the one or more processors configured to cause the service device to receive at least one of the authorization policy associated with the network entity, or the endpoint key, or the root key, or the one or more middlebox key parameters comprises the one or more processors configured to cause the service device to receive the one or more middlebox key parameters.

10. A method of wireless communication at a service device, comprising:
   initiating a service access for a connection with regard to a user equipment (UE);
   transmitting, to a security service device, a service key request;
   receiving, from the security service device, at least one of:
      an authorization policy associated with a network entity,
      an endpoint key associated with a security key for the network entity,
      a root key from which the endpoint key is derivable, or
      one or more middlebox key parameters;
   receiving a communication from the UE via the network entity, the communication having a protocol data unit (PDU) format that includes one or more mutable fields; and
   verifying, using the endpoint key, that a modification, an insertion, or a removal of the one or more mutable fields of the communication are authorized for the network entity in accordance with a middlebox security policy.

11. The method of claim 10, wherein the one or more middlebox key parameters comprise one or more parameters from which a security key associated with the authorization policy or an authorized action can be derived.

12. The method of claim 10, further comprising:
   receiving the middlebox security policy associated with the network entity.

13. The method of claim 10, wherein receiving the communication from the UE via the network entity comprises:
   receiving the communication in accordance with a tunneling protocol, wherein the network entity is configured as a proxy associated with the tunneling protocol.

14. The method of claim 10, further comprising:
   deriving the endpoint key using the root key.

15. The method of claim 10, further comprising:
   deriving the endpoint key using the one or more middlebox key parameters.

16. A non-transitory computer-readable medium storing a set of instructions for wireless communication comprising:
   one or more instructions that, when executed by one or more processors of a service device, cause the service device to:
      initiate a service access for a connection with regard to a user equipment (UE);
      transmit, to a security service device, a service key request;

receive, from the security service device, at least one of:
  an authorization policy associated with a network entity,
  an endpoint key associated with a security key for the network entity,
  a root key from which the endpoint key is derivable, or
  one or more middlebox key parameters;
receive a communication from the UE via the network entity, the communication having a protocol data unit (PDU) format that includes one or more mutable fields; and
verify, using the endpoint key, that a modification, an insertion, or a removal of the one or more mutable fields of the communication are authorized for the network entity in accordance with a middlebox security policy.

17. The non-transitory computer-readable medium of claim 16, wherein the one or more middlebox key parameters comprise one or more parameters from which a security key associated with the authorization policy or an authorized action can be derived.

18. The non-transitory computer-readable medium of claim 16, further comprising instructions that cause the service device to:
  receive the middlebox security policy associated with the network entity.

19. The non-transitory computer-readable medium of claim 16, wherein the instructions that cause the service device to receive the communication from the UE via the network entity comprise instructions that cause the service device to:
  receive the communication in accordance with a tunneling protocol, wherein the network entity is configured as a proxy associated with the tunneling protocol.

20. The non-transitory computer-readable medium of claim 16, further comprising instructions that cause the service device to:
  derive the endpoint key using the root key or the one or more middlebox key parameters.

\* \* \* \* \*